June 10, 1969

F. C. BOOTH 3,448,825

PROCESS AND APPARATUS FOR SUPPRESSING
JET ENGINE EXHAUST NOISE
Filed July 27, 1967

INVENTOR
FRED C. BOOTH
BY
ATTORNEY

United States Patent Office
3,448,825
Patented June 10, 1969

3,448,825
PROCESS AND APPARATUS FOR SUPPRESSING JET ENGINE EXHAUST NOISE
Fred C. Booth, 117–B Buckingham Drive,
Lakewood, N.J. 08701
Filed July 27, 1967, Ser. No. 656,458
Int. Cl. F01n 5/02
U.S. Cl. 181—35     16 Claims

ABSTRACT OF THE DISCLOSURE

Process and apparatus for discharging the exhaust of conventional jet engines as laminar flow in the supersonic range with small divergence and at approximately, or slightly below, atmospheric pressure and thereby to reduce jet stream noise.

Background of the invention

This invention relates to suppressing engine exhaust noise and, in particular, to improved processes and apparatus for suppressing the exhaust noise of jet engines while maintaining high power-thrust efficiency.

The noise of turbo-jet engines on modern jet airplanes has become an increasing public nuisance and hazard. With increased numbers and intensity of aircraft arriving near, departing from and flying above populated residential areas, such nuisances and hazards have been declared by government authorities to be a problem requiring an abatement at the earliest possible date.

It is an object of this invention to greatly reduce the objectionable noises generated by the discharge of exhaust gases from turbo-jet engines.

Another object is to provide such a device in a form suitable for incorporation into a turbo-jet engine at its time of manufacture.

Another object is to provide such a device in a form suitable for modifications and improvements of existing turbo-jet engines.

Another object is to provide such a device in a form suitable for an attachment to a reciprocating internal combustion engine for silencing the exhaust discharge gases.

Another object of the invention is to provide a turbo-jet noise suppressor which will not materially reduce the propulsive thrust reaction of the exhaust gases emanating therefrom.

Another object of the invention is to provide a turbo-jet noise suppressor which is simple to manufacture, light in weight and simple to maintain.

Another object of the invention is to provide a turbo-jet noise suppressor capable of meeting a minimum performance of 30 decibels sound pressure attenuation in jet noise.

Another object is to provide such a device in a form compatible with the preferred location of the thrust reversor braking component of the jet engine, such noise suppressor being locatable either upstream or downstream of the thrust reversor.

Still another object of the invention is to provide an improved jet exhaust silencer with greater noise reduction and higher power thrust efficiency than prior art noise attenuators.

A large variety of noise suppression devices have appeared in the prior art, especially in the past ten or twelve years, in attempts to solve the outstanding problems. A review of these designs indicate that, generally, there has been a lack of understanding among designers of the phenomenon involved in the creation of noise by the flow of exhaust gases into atmosphere.

Conventionally, exhaust gases that leave an aircraft turbine wheel may have a representative subsonic velocity of 800 f.p.s., a temperature of 840° F., and a static pressure of 17 p.s.i.a. which is 15% above one atmosphere at sea level. Such gas stream enters atmosphere as the back pressure and finds the flow path of least resistance to be radial expansion, in as much as the circumferential path from the traditional cylindrical tailpipe offers more than three times freer flow than the axial path. Consequently, such representative gas stream expands radially at initial velocity not less than about 250 f.p.s. until damped out by an overexpansion and de-ionization.

The overexpansion is promoted by the large excess of viscosity in the hot gas as compared with atmospheric air. The higher viscosity makes the gas stream coherent and substantially undiluted by air and therefore not cooled by mixing.

The radical overexpansion is followed by radially reversed caviational collapse which creates a transaxial sound wave constituting a single shock in an axial system of succeeding shocks.

The system of succeeding shock waves can be seen at night in the jet stream where alternate de-ionization and reionization create glowing discs or "lozenges" which are commonly spaced axially about 3 diameters. These transverse shocks account for the typical polar diagram of sound pressures in a horizontal plane about an aircraft, a large proportion of noise occurring at 150° azimuth with considerable falling off in noise dead astern. Typically, the noise level increases about 20 decibels from 80° azimuth to a maximum near 150° azimuth which is 30° forward of dead astern. Many instrument readings of sound intensity as high as 140 decibels at 100 ft. distances have indicated that the jet creates powerful transverse vibratory forces. These indications are borne out by military experience of fractured steel panels in adjacent fixed structures by resonant phenomenon.

Many engine designers mistakenly believe that noise pressure in the exist gas-stream provides useful thrust by impingement upon a mass of quiet atmosphere. Rocket devices illustrate that jet thrust does not utilize external impingement of this type, but rather internal reaction generating mass flow according to Newton's Theory. Consequently, a noisy jet exhaust is not only a nuisance and a hazard but is not useful for propulsion.

Traditional tailpipe design usually illustrates an erroneous concept in respect to true heat energy of exhaust gases. As calculated according to classical text-book teaching, only the active components resulting from combustion are considered in main heat contributions of roughly 50% from water and 50% from $CO_2$ of stoichiometric ratio.

Actually, this ratio will produce water vapor in volume about twice that of $CO_2$ because of entrained moisture in the air of combustion being added to water of composition. There the total heat energy contributed by water becomes about 10 times that of $CO_2$ because of specific heat of water being about 5 to 1 over $CO_2$.

With traditional air excess about 4 to 1 in turbine combustion, the total heat energy of exhaust becomes essentially due to water vapor, and explains the enormous expansion pulse amplitudes which are associated with the recorded high intensities of unwanted sound levels in turbine exhaust noise.

The jet engine designer usually overlooks the fact that the fluid energy medium creates unstable vortices and cavitation in the tailpipe unless proper provision in the design is made to minimize these phenomena before they lead to noise and vibration. The flow of exhaust gases delivered into the traditional tailpipe by the turbine buckets tends to continue in a swirling mass of tubular form. Due to containment of the mass by a surrounding stationary shell, the elements of the mass which are in contact with the shell lose some velocity by friction in a boundary layer. In turn, each inward annular element of the mass loses velocity in reduced degree until the highest rotational velocity is limited to the innermost element of the mass, thus forming a vortex.

Any vortex is supported by the exterior fluid elements, and therefore shows the characteristics of instability and cavitation. The instability causes an eccentric surging of the rotating gas mass which prevents uniformly distributed exit flow from the nozzle. In addition, the central cavitation bubble encourages an intrusion of atmospheric air into the nozzle to spoil some of the thrust, as well as squeeze the hotter gas into the radial movement of expansion and collapse as described above.

Consequently, a successful design of silencer should desirably include means to prevent vortex and cavitation occurrence. One embodiment of this invention employs fins to convert the swirling gas discharge from the turbine buckets to linear flow and divides the total flow capacity of the tailpipe into a number of parallel, longitudinal conduits separated by intervening walls. In addition, each individual conduit can optionally include one or more anti-vortex fins running longitudinally on its inner surface.

Summary of the invention

In summary, prior art noise suppressors have been designed according to the theory that jet noise is caused by excessive velocity of the jet stream. Based upon such theory, prior art devices have attempted to reduce noise by reducing the jet stream velocity by diverting, splitting and cooling the exhaust gas stream with attendant sacrifice in thrust.

Broadly speaking, this invention is based upon the theory that objectionable jet exhaust noise is caused principally by gas pressure above atmospheric pressure as it leaves the tailpipe. Therefore, this invention is directed to reducing the jet stream pressure as it leaves the tailpipe to approximately atmospheric pressure or less than atmospheric pressure, and simultaneously increasing the jet stream velocity for conserving the energy in the jet stream and thereby improving thrust efficiency.

The prior art velocity-decreasing systems generally encouraged free radial expansion of the above atmospheric pressure jet stream issuing from the tailpipe and it is believed that cyclic over-expanded gas pulses followed by cavitation collapse thereat is the principal source of objectionable jet noise. In contradistinction, this invention restrains radial expansion of the jet stream after its pressure is reduced to approximately atmospheric pressure or below atmospheric pressure, and thereby the cyclic over-expansion-cavitation collapse pulses are eliminated in the low divergence, high velocity, exhaust stream. Such stream is effectively contained by a ambient atmosphere for a considerable distance behind the engine. Generally, the prior art systems have short highly divergent nozzles while this invention employs relatively long divergent nozzle sections having a relatively small angle of divergence.

According to the invention, there is provided a process of suppressing exhaust noise generated by a jet engine which comprises the steps of: passing exhaust gases into a plenum chamber for uniform laminar flow distribution to a plurality of exhaust flow channels; increasing velocity and decreasing pressure of the gases in each flow channel leaving the plenum chamber until their velocity becomes approximately sonic; and further increasing the velocity of the gases in each flow channel into the supersonic range while maintaining laminar flow until at the region of laminar flow discharge of each flow channel into the atmosphere the static pressure is less than 15 p.s.i.a., whereby the ambient atmosphere tends to contain and not disrupt the exhaust gas discharge as laminar flow.

Also, according to the invention, there is provided a device for suppressing exhaust noise generated by a jet engine which comprises: a plenum chamber; first means passing exhaust gases from a jet engine into the plenum chamber; a plurality of second means each in communication at its inlet side with the plenum chamber for increasing velocity of gases flowing therethrough in laminar flow state from the plenum chamber to the degree where the gas velocity becomes approximately sonic; and a plurality of third means each in communication with the outlet side of its associated second means for further increasing the velocity of the gases flowing therethrough into the supersonic range while maintaining laminar flow until at the region of laminar flow discharge of the third means into the atmosphere the static pressure of the gases is less than 15 p.s.i.a., whereby the ambient atmosphere tends to contain and not disrupt the exhaust gas discharge as laminar flow.

Description of preferred embodiments

Figure 1:
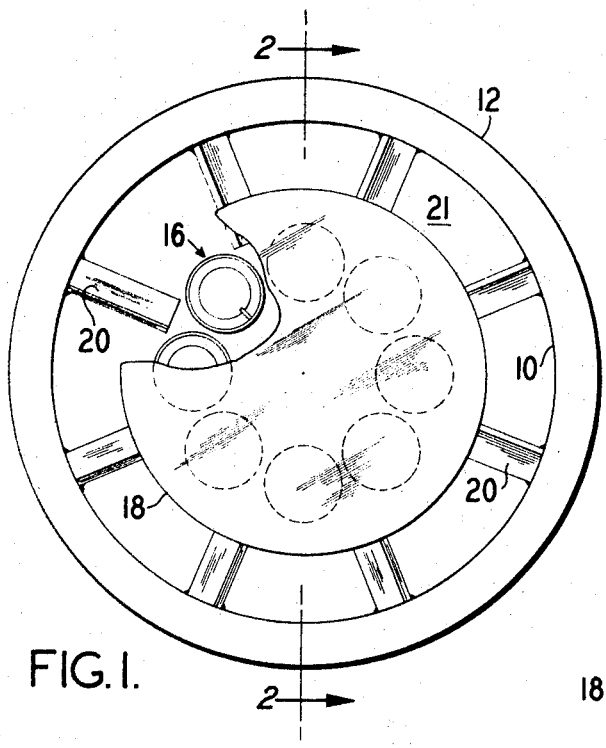
FIG. 1 is an end side view of a jet engine silencer according to the invention which receives the exhaust gases from the jet engine turbine buckets.
Figure 2:
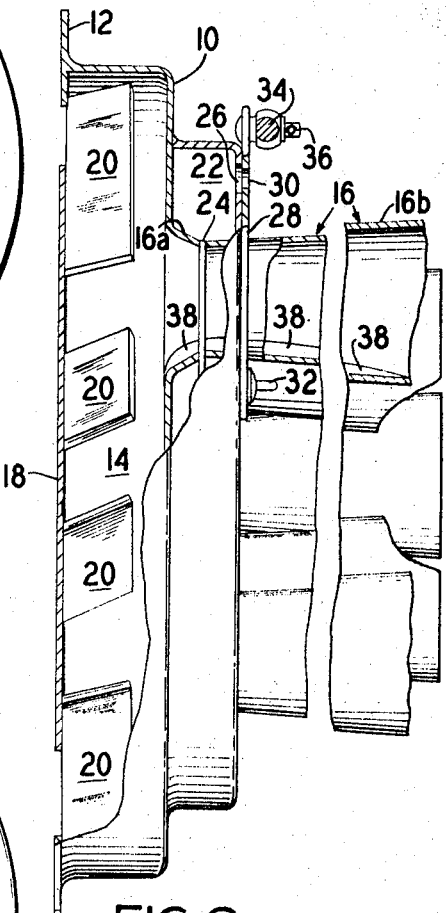
FIG. 2 is a cross-sectional view of the engine silencer of FIG. 1 on lines 2—2 thereof.
Figure 3:
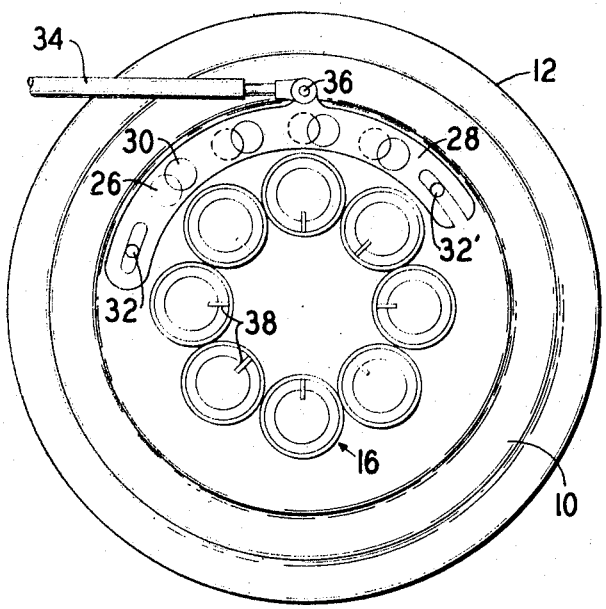
FIG. 3 is an end side view of the engine silencer of FIG. 1 which discharges the exhaust gases into the atmosphere.

As shown in FIG. 1 (inside end view from engine), FIG. 2 (cross-sectional view) and FIG. 3 (outside end view), the jet noise silencer comprises a sheet metal housing 10 which is attachable by conventional means such as bolts (not shown) passing through flange 12 for attachment to the exhaust end of a jet engine (not shown). The housing 10 forms a plenum 14 at the exit end of which there is positioned preferably eight convergent-divergent nozzles 16, such as DeLaval nozzles. A diaphram or bulkhead 18 in the form of a disk, is mounted from the housing 10 by a plurality of spaced radial members 20 to form an annular intake passage 18 (between 12 and 18) into plenum 14 from the exhaust end of the jet engine (not shown). Preferably, the spaced members 20 are shaped as curved vanes to convert rotational movement of the exhaust gases leaving the jet engine into axial flow movement into the plenum 14.

Optionally, a second plenum chamber 22 is formed within the housing 10 which communicates at its exit end into the throat portion 24 of the nozzles 16. A plurality of apertures 26 are positioned along an arc in the housing 10 to form a plurality of air inlet ports to plenum 22. Aperture ports 26 are selectively and variably closeable by a plate 28 having a plurality of apertures 30. Arcuate movement of plate 28 around guides 32, 32' selectively matches and mismatches apertures 22 and 30 so as to vary the net intake opening for air from atmosphere into plenum chamber 22 and thence into throat 24 of nozzle 16. Plate 28 can be conveniently rotated by a control rod 34, which is rotatably mounted to 28 by a pin 36, for mixing ambient air with the exhaust gases.

Optionally, longitudinal vanes 38 extend into the interior of each nozzle to convert any residual rotational gas flow therein into linear gas flow.

Nozzles 16 each have a convergent portion 16a and a divergent portion 16b with the throat portion 24 there between. According to this invention, the nozzles 16 are designed so that the velocity of the engine exhaust gas which enter the converging portions 16a is increased to approximately sonic velocity at the throat 24. Thereafter, the velocity of the gas is increased to supersonic in the diverging portion 16b and the exit pressure therefrom is maintained at approximately atmospheric pressure and preferably slightly below atmospheric pressure.

The following disclosure explains how the nozzles 16 are designed for a representative aircraft jet engine such as the well known Dart Engine as manufactured by Rolls Royce of England, which discharges a fluid flow of 21 pounds weight per second. Each of the eight nozzles 16 shown in FIGS. 1 to 3 then have a representative flow of 2.6 lbs. per sec.

The plenum chamber 14 is a collecting reservoir that is maintained under pressure of 17 p.s.i.a., at temperature of 1300° F. absolute. It can be considered as an infinite reservoir without gas movement therein, from which nozzles 16 will draw by expansion. The gas is substantially atmospheric air that is saturated with superheated water-vapor.

Each nozzle 16 is a directive channel whose prime function is the conversion of thermal energy of gas into kinetic energy of the issuing stream. Our representative nozzle then will receive at its entrance: gas of zero velocity, static pressure 17 p.s.i.a., temperature 1300° F. abs. and density 0.035 pound per cubic foot, by the formula:

$$\frac{1.325 \text{ Hg (barometer)}}{\text{Temp. ° F. abs.}}$$

The temperature gradient from 1300° F. abs. down to 595° F. abs. (70° F. thermometer) establishes gas flow in the nozzle and continues it under the conditions set forth in the following Table I where stations 1 to 8 are located between the entrance (station No. 1) of the converging nozzle portion 16a and the throat 24 (station No. 9). Stations 9 to 16 are located between the throat 24 (station No. 9) and the discharge end of diverging nozzle 16b (station No. 16). For illustrative purposes, stations 1 to 8 are located to show decrements corresponding to one pound pressure reduction. Continuing this arbitrary division for stations 9 to 16, the first decrement downstream of throat 24 establishes a new scale of decreasing pressures, all derived from the new initial pressure of 9 p.s.i.a. at the throat 24 (station No. 8) as shown in Table II.

TABLE I.—JET NOISE-SUPPRESSION NOZZLE CALCULATION

| | | | | Column | | | | | |
|---|---|---|---|---|---|---|---|---|---|
| 1 | 2 | 3 | 4 | 5 | 6 | 7 | 8 | 9 | 10 |
| Pln | 17 | 1,300 | 312 | 0 | 0 | 28.3 | | | |
| 1 | 16 | 1,280 | 307 | 5 | 500 | 29.6 | .0592 | 22.05 | 5.3 |
| 2 | 15 | 1,260 | 302 | 10 | 707 | 31.1 | .0430 | 16.0 | 4.52 |
| 3 | 14 | 1,237 | 297 | 16 | 896 | 32.7 | .0365 | 13.6 | 4.16 |
| 4 | 13 | 1,212 | 291 | 23 | 1,075 | 34.5 | .0321 | 12.03 | 3.91 |
| 5 | 12 | 1,175 | 282 | 28 | 1,190 | 36.5 | .0306 | 11.42 | 3.81 |
| 6 | 11 | 1,154 | 277 | 35 | 1,340 | 38.9 | .0290 | 10.82 | 3.71 |
| 7 | 10 | 1,120 | 269 | 43 | 1,470 | 41.4 | .0282 | 10.5 | 3.66 |
| 8 | 9 | 1,082 | 260 | 52 | 1,615 | 44.5 | .0277 | 10.35 | 3.63 |
| 9 | 15.3 | 1,060 | 254 | 58 | 1,705 | 49.0 | .0289 | 10.7 | 3.69 |
| 10 | 15.6 | 1,020 | 245 | 67 | 1,840 | 54.0 | .0293 | 10.95 | 3.73 |
| 11 | 16.1 | 975 | 234 | 78 | 1,960 | 60.2 | .0307 | 11.45 | 3.82 |
| 12 | 16.4 | 925 | 222 | 90 | 2,130 | 68.5 | .0322 | 12.0 | 3.91 |
| 13 | 16.3 | 868 | 208 | 104 | 2,280 | 80.0 | .0350 | 13.05 | 4.08 |
| 14 | 14.6 | 800 | 192 | 120 | 2,455 | 98.7 | .0401 | 15.0 | 4.37 |
| 15 | 14.2 | 727 | 175 | 137 | 2,620 | 134.5 | .0513 | 19.15 | 4.94 |
| 16 | 12.7 | 595 | 143 | 169 | 2,910 | 220.0 | .0757 | 28.25 | 6.00 |

Column:
No. 1: Station.
No. 2: P.s.i.a. static, lbs.
No. 3: Temp., ° F. abs.
No. 4: Enthalpy, B.t.u./lb. per ° F. abs.
No. 5: Heat drop, B.t.u. $H_1 - H_2$.
No. 6: Velocity, f.p.s. $224\sqrt{H_1 - H_2}$.
No. 7: Specific volume, ft.$^3$/lb.
No. 8: Specific volume ÷ velocity, area for 1 lb./sec. sq. ft.
No. 9: Area, sq. in. for 2.6 lb./sec.
No. 10: Diam. of nozzle inches.

Nozzle portion 16a establishes a moderate degree of expansion in the stream of gas issuing from the reservoir 14, dropping the temperature from 1300° F. abs. to about 1082° F. abs. at throat 24. All conditions at the throat depend upon the achievement of sonic velocity for air at 1082° F. abs. as establishing the low limit for pressure and rate of mass flow in the convergent nozzle 16a. The ratio is 0.53 of initial pressure to nozzle, or 0.53×17 p.s.i.a.=9 p.s.i.a. Also, the ratio is 0.833 of initial temperature, or 0.833×1300° F. abs.=1082° F. abs. (See reference "Thermodynamics" by H. A. Everett, 2nd Ed. 1941, p. 256 et seq.)

At the throat 24, about 28% of total available heat energy has been converted to acceleration of the gas stream to sonic velocity. The balance of available energy is then available for supersonic acceleration and expansion of gas as may be required to arrive at atmospheric pressure or slightly less, at the exit end of 16b. Supersonic velocity begins at station No. 9 and increases to a maximum at station No. 16.

Nozzle section 16b accomplishes such conversion of heat energy by a diverging channel, first by rapid expansion at moderate supersonic velocity to add about 7 p.s.i.a. to the existing 9 p.s.i.a. at throat. Further expansion gradually reduces the additive pressure and increases velocity as shown in Table I.

Table II shows the effects of reduced temperature for each diverging station Nos. 9 to 16. The final result is a selective sub-atmospheric pressure, whether at sea-level or at altitude.

TABLE II.—JET NOISE-SUPPRESSION CALCULATION DYNAMIC PRESSURE ADDITIVE TO 9 P.S.I.A.

$$\text{Dyn. press.} = \frac{dV^2}{9250}$$

where
$d$ = Air density (lb./ft.$^3$)
$V$ = Velocity (ft./sec.)

| Station | Temp., °F. abs. | | Lbs. |
|---|---|---|---|
| 9 | 1060 | $\frac{.02}{9250} 1705^2 = 2.16 \cdot 10^{-6} \times 29 \cdot 10^5 = 62.6 \cdot 10^{-1}$ | =6.3+9=15.3 |
| 10 | 1020 | $\frac{.018}{9250} 1840^2 = 1.95 \cdot 10^{-6} \times 33.8 \cdot 10^5 = 66 \cdot 10^{-1}$ | =6.6+9=15.6 |
| 11 | 975 | $\frac{.017}{9250} 1960^2 = 1.84 \cdot 10^{-6} \times 38.5 \cdot 10^5 = 71 \cdot 10^{-1}$ | =7.1+9=16.1 |
| 12 | 925 | $\frac{.015}{9250} 2130^2 = 1.62 \cdot 10^{-6} \times 45.5 \cdot 10^5 = 74 \cdot 10^{-1}$ | =7.4+9=16.4 |
| 13 | 868 | $\frac{.013}{9250} 2280^2 = 1.40 \cdot 10^{-6} \times 52 \cdot 10^5 = 73 \cdot 10^{-1}$ | =7.3+9=16.3 |
| 14 | 800 | $\frac{.010}{9250} 2455^2 = 1.08 \cdot 10^{-6} \times 60 \cdot 10^5 = 56 \cdot 10^{-1}$ | =5.6+9=14.6 |
| 15 | 727 | $\frac{.007}{9250} 2620^2 = 0.76 \cdot 10^{-6} \times 68.5 \cdot 10^5 = 52 \cdot 10^{-1}$ | =5.2+9=14.2 |
| 16 | 595 | $\frac{.004}{9250} 2910^2 = 0.43 \cdot 10^{-6} \times 85 \cdot 10^5 = 37 \cdot 10^{-1}$ | =3.7+9=12.7 |

All of the above calculations neglect the heat losses due to gas friction and to radiation from the hot engine. Also, the approximate symmetry of Table I near the throat is not followed in structure. The low gas friction in convergence permits that region to be no longer than ⅓ or ¼ of the divergence length.

For the representative nozzle design according to the invention, and as shown in Tables I and II, the angle of divergence and the length of nozzle section 16b can be 5° and 8.4 inches, respectively, for discharge pressure 14.6 p.s.i.a. slightly below atmospheric pressure.

According to the invention, the angle of divergence of nozzle portion 16b must be less than a value which induces flow separation. It has been found that such angle of divergence should be less than approximately 8° and preferably about 4° to 6° and the length of divergent nozzle portion 16b should be more than approximately 8 times, and preferably equal to 10 times, the difference between throat and exit (of 16b) diameters.

In operation, the high velocity exhaust gases of the invention diffuse axially into atmosphere without shock, by conversion of velocity energy into mass turbulence of vortex rings. Here, the high viscosity of hot gases at sub-atmospheric (preferred) pressure creates a non-cavitating core of exhaust gas that is initially constrained by atmosphere until the vortex rings gradually cause cooling of exhaust by mixing it with air.

As a desired degree of noise suppression, the Navy has established a specification target value of 30 decibels minimum sound pressure reduction from existing level. Various civil airlines claim to have achieved 12 or 15 decibels attenuation as the maximum now attainable by the state of the art.

By contrast, embodiments of this invention can be proportioned to achieve the substantial silence of speech, rated at 20 decibels above zero. Thus the total attenuation can encompass 120 decibels, or 4 times the Navy specification, and about 8 times the existing civil airline accomplishment.

Furthermore, this invention can be implemented with much less bulk and weight of structure than is required for conventional tailpipes. A representative tailpipe of prior art design will have a functional diameter somewhat greater than engine diameter, an overall length of about 2 diameters, and a weight upwards of 150 pounds. By contrast, embodiments of this invention for the same engine will have a functional diameter much less than engine diameter, an overall length one-third of engine diameter, and weight about 50 pounds.

The sonic gas velocity in the throat 24 of the DeLaval Nozzle 16a, 16b, has a second useful function in the invention which creates a compound-nozzle to act as an inductor of atmospheric air into the nozzle flow. The compound-nozzle is achieved by separating the convergent element 16a by a narrow space from its paired divergent section 16b as shown in FIG. 1. Then the subatmospheric pressure of gas flowing in the throat region will induce added flow of atmospheric air and thereby increase the mass of flow. Such increase of mass flow also amplifies thrust. The quantity of induced air flow is throttled as desired for optimum effect by control rod 34 and the apertured rotatable plate 28.

What I claim is:

1. The process of suppressing exhaust noise generated by a jet engine which comprises the steps of: passing exhaust gases into a plenum chamber for uniform laminar flow distribution to a plurality of exhaust flow channels; increasing velocity and decreasing pressure of the gases in each flow channel leaving the plenum chamber until their velocity becomes approximately sonic; and further increasing the velocity of the gases in each flow channel into the supersonic range while maintaining laminar flow until at the region of laminar flow discharge of each flow channel into the atmosphere the static pressure is less than 15 p.s.i.a., whereby the ambient atmosphere tends to contain and not disrupt the exhaust gas discharge as laminar flow.

2. The process of suppressing exhaust noise, according to claim 1, wherein the static pressure at the discharge of each flow channel is approximately atmospheric.

3. The process of suppressing exhaust noise, according to claim 1, wherein the static pressure at the discharge of each flow channel is preferably less than the atmospheric pressure.

4. The process of suppressing exhaust noise, according to claim 1, including the step of converting any rotational movement of the exhaust gases prior to said plenum chamber into axial flow into said plenum chamber.

5. The process of suppressing exhaust noise, according to claim 1, including the step of introducing atmospheric air into each flow channel where the velocity is sonic.

6. The process of suppressing exhaust noise, according to claim 1, including the step of suppressing rotational movement of the gases while they are in said sonic and supersonic range.

7. Device for suppressing exhaust noise generated by a jet engine which comprises: a plenum chamber; first means passing exhaust gases from a jet engine into said plenum chamber; a plurality of second means each in communication at its inlet side with said plenum chamber for increasing velocity of gases flowing therethrough in laminar flow state from said plenum chamber to the degree where the gas velocity becomes approximately sonic; and a plurality of third means each in communication with the outlet side of its associated second means for further increasing the velocity of the gases flowing therethrough into the supersonic range while maintaining laminar flow until at the region of laminar flow discharge of said third means into the atmosphere the static pressure of the gases is less than 15 p.s.i.a., whereby the ambient atmosphere tends to contain and not disrupt the exhaust gas discharge as laminar flow.

8. Device according to claim 7 wherein each of said second means and its associated third means is a convergent-divergent nozzle.

9. Device according to claim 8 wherein the angle of divergence of the divergent portion of said nozzle is less than 10°.

10. Device according to claim 8 wherein the angle of divergence of said divergence portion of said nozzle is preferably between 4° and 6°.

11. Device according to claim 9 wherein the length of said divergent portion of said nozzle is more than 8 times the difference between the inlet and outlet diameter of the divergent nozzle portion.

12. Device according to claim 10 wherein the length of said divergent portion of said nozzle is preferably equal to 10 times the difference between the inlet and outlet diameter of the divergent nozzle portion.

13. Device according to claim 7 wherein said first means includes fixed vanes to convert rotational movement of the exhaust gases leaving said jet engine into axial flow gas movement into said plenum chamber.

14. Device according to claim 7 including means to introduce ambient air into the gas flow between said second and said third means.

15. Device according to claim 7 which includes means associated with said second and third means for suppressing rotational movement of the gases therethrough.

16. Device according to claim 15 wherein said means for suppressing rotational movement of the gas includes a straight fin projecting from a wall of said second and third means partially into the gas flow region therethrough.

References Cited

UNITED STATES PATENTS

| | | | |
|---|---|---|---|
| 2,563,509 | 8/1951 | Baird | 181—33 |
| 2,936,846 | 5/1960 | Tyle et al. | 181—33 |
| 3,144,913 | 8/1964 | Bailey | 181—33 |
| 3,187,835 | 6/1965 | Smith | 181—33 |
| 3,374,857 | 3/1968 | Hutchins | 181—58 |

FOREIGN PATENTS

| | | |
|---|---|---|
| 175,107 | 2/1922 | Great Britain. |
| 913,152 | 12/1962 | Great Britain. |

ROBERT S. WARD, JR., *Primary Examiner.*

U.S. Cl. X.R.

181—51, 56, 58